(12) United States Patent
Ebihara

(10) Patent No.: US 7,546,218 B2
(45) Date of Patent: Jun. 9, 2009

(54) DIMENSION MEASURING DEVICE

(75) Inventor: Masato Ebihara, Ibaraki (JP)

(73) Assignees: Tokyo Seimitsu Co., Ltd., Tokyo (JP); Tosei Engineering Corp., Ibaraki (JP)

( * ) Notice: Subject to any disclaimer, the term of this patent is extended or adjusted under 35 U.S.C. 154(b) by 171 days.

(21) Appl. No.: 11/329,812

(22) Filed: Jan. 10, 2006

(65) Prior Publication Data
US 2006/0173650 A1  Aug. 3, 2006

(30) Foreign Application Priority Data
Jan. 31, 2005  (JP) ............... 2005-023424

(51) Int. Cl.
G01B 7/00 (2006.01)
G01B 15/00 (2006.01)

(52) U.S. Cl. ..................................... 702/155
(58) Field of Classification Search ............ 702/94, 702/95, 150, 155
See application file for complete search history.

(56) References Cited

U.S. PATENT DOCUMENTS

| 5,280,567 | A | 1/1994 | Kobayashi | |
| 6,497,051 | B1 * | 12/2002 | Poole et al. ............... | 33/784 |
| 2006/0106568 | A1 * | 5/2006 | Feldman .................. | 702/158 |
| 2006/0208875 | A1 * | 9/2006 | Ebihara .................... | 340/539.1 |

FOREIGN PATENT DOCUMENTS

| DE | 42 15 733 A1 | 11/1993 |
| DE | 4215733 A1 | 11/1993 |
| EP | 0 103 216 A1 | 3/1984 |
| EP | 0103216 A1 | 3/1984 |
| FR | 2 790 826 A1 | 9/2000 |
| FR | 2790826 A1 | 9/2000 |
| JP | 4-64011 | 2/1992 |
| JP | 7-334113 | 12/1995 |

OTHER PUBLICATIONS

Partial English translation of relevant parts of DE 42 15 733 A1 col. 2, lines 49-58, Claim 1.
Partial English translation of relevant parts of EP 0 103 216 A1, p. 4, lines 3-9, p. 14, lines 18-24, Claims 1 and 2.
Partial English translation of relevant parts of FR 2 790 826 A1, p. 7, lines 22-23, p. 8, lines 24-25, p. 10, lines 27-29, p. 11, lines 29-31.
European Search Report for European application No. 06250455.0, dated Jun. 13, 2006, in the name of Tokyo Seimitsu Co., Ltd.
Patent Abstract of Japan, Publication No. 07-334113, Published on Dec. 22, 1995, in the name of Morita.

* cited by examiner

Primary Examiner—Michael P Nghiem
(74) Attorney, Agent, or Firm—Christie, Parker & Hale, LLP.

(57) ABSTRACT

A dimension measuring device that has improved operability when an expensive display device, such as, a bar graph is used. The device includes plural dimension measuring sections and a display section for displaying dimension measurements generated by the plural dimension measuring sections, wherein the number of dimension measurements the display section can display simultaneously is less than the number of dimension measurements generated by the plural dimension measuring sections. The device also includes a display control section, which automatically selects a dimension measurement to display on the display section in accordance with the dimension measurements generated by the plural dimension measuring sections.

20 Claims, 12 Drawing Sheets

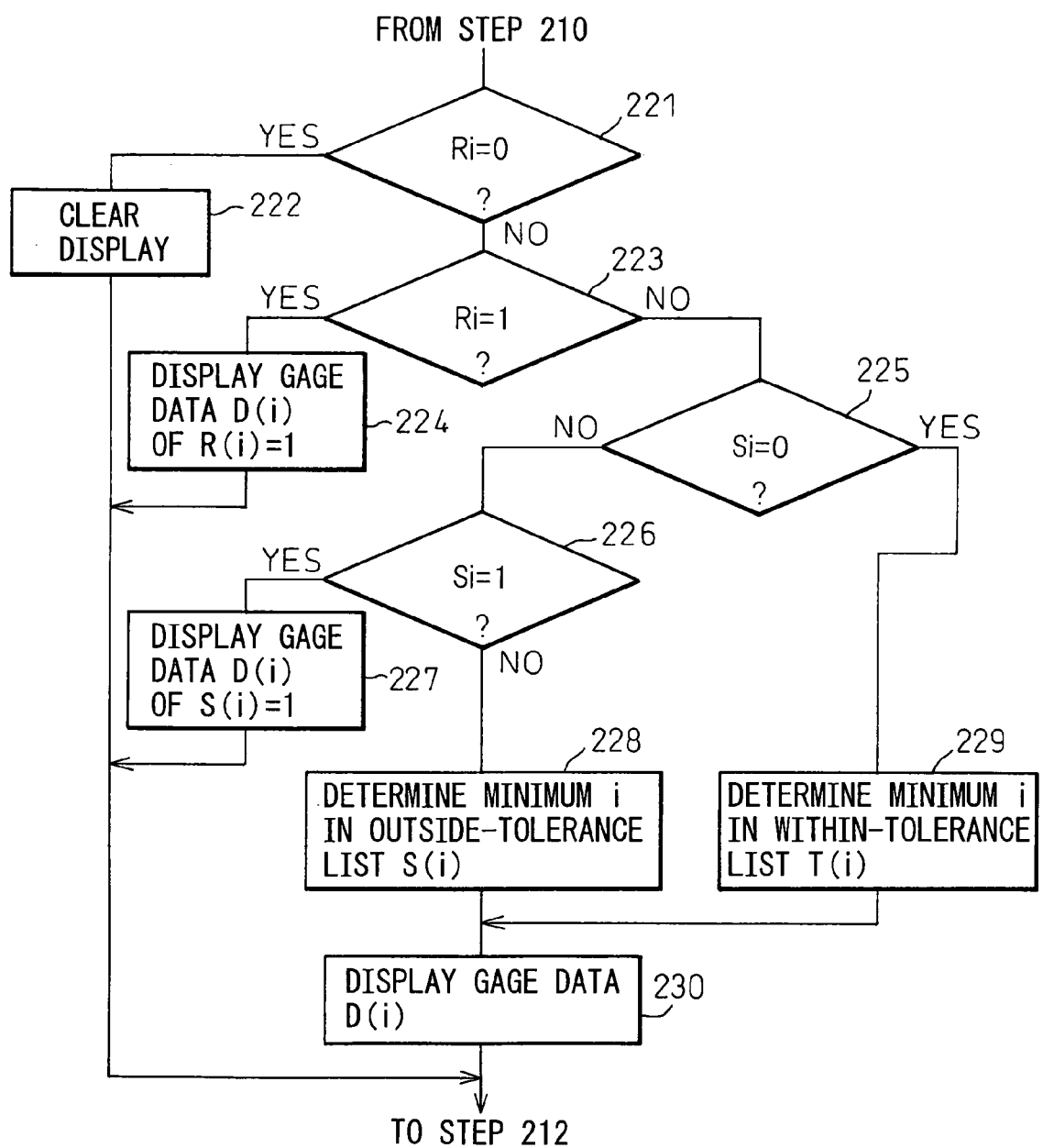

FIG.8A

WHEN NO IN STEP 226
↓
DETERMINE i WHOSE DIFFERENCE BETWEEN TOLERANCE AND GAGE DATA D(i) IS MAXIMUM IN OUTSIDE-TOLERANCE LIST S(i) — 231
↓
TO STEP 230

FIG.8B

WHEN YES IN STEP 225
↓
DETERMINE i WHOSE DIFFERENCE BETWEEN TOLERANCE AND GAGE DATA D(i) IS MINIMUM IN WITHIN-TOLERANCE LIST T(i) — 232
↓
TO STEP 230

DIMENSION MEASURING DEVICE

CROSS-REFERENCE TO RELATED APPLICATION

This application claims priority of Japanese Patent Application Number 2005-023424, filed on Jan. 31, 2005.

BACKGROUND OF THE INVENTION

The present invention relates to a dimension measuring device that measures dimensions, such as inner diameters, outer diameters and depths, and displays the measured dimension measurements and, more particularly, to a dimension measuring device that commonly displays, in a bar graph etc., plural dimension measurements measured by plural dimension measuring sections.

In a machining device or processing device, the state of machining or processing is managed by measuring dimensions of each portion. For each portion to be measured, a tolerance, which is an allowable dimension range, is specified and it is required for a dimension measurement to be within this tolerance. In order to make it easy to judge that a dimension measurement is within a tolerance, the dimension measurement is displayed in a graph and an upper limit value and a lower limit value of the tolerance are displayed in accordance with the graph. A typical graphic display is a bar graph display. Although the present invention is not limited to a bar graph display, explanation is given here using, as an example, a bar graph display. The display of a dimension measurement in a bar graph is described in, for example, Japanese Unexamined Patent Publication (Kokai) No. 4-64011 and Japanese Unexamined Patent Publication (Kokai) No. 7-334113, therefore, a detailed explanation is not given here. By the way, because a bar graph uses an LED, an LCD (Liquid Crystal Display), etc., it becomes expensive.

Methods for measuring dimensions at each portion include various types and the present invention can be applied to any type of dimension measuring device. Respective methods for measuring dimensions are widely known and, therefore, an explanation is not given here.

Conventionally, in a dimension measuring device that displays a bar graph, a dimension measuring section corresponds, one to one, to a bar graph. In other words, the number of dimension measuring sections and the number of bar graphs are equal. A more general configuration is such one in which a dimension measuring unit having one dimension measuring section is connected to a column having one bar graph. A dimension measuring unit is connected to a column via cable and connector and various dimension measuring units can be connected thereto in accordance with objects to be measured. It has been proposed recently that a dimension measuring unit and a column are connected by a radio communication channel.

However, in a manufacturing process etc., there are cases where plural objects are measured in the same process and if a dimension measuring device is provided for each object to be measured, the facility cost is increased and a large space is required, resulting in a problem of poor usability. Therefore, a configuration has been suggested in which plural bar graphs are provided in a column and plural dimension measuring units are connected, however, such a configuration is just one in which conventional dimension measuring devices are simply combined and it cannot solve the problem that the cost is increased. By the way, as a modification example of such a configuration, there may be a case where one dimension measuring unit is provided with plural dimension measuring sections for measuring dimensions of plural portions and in such a case, a column having plural bar graphs is used.

In order to solve the above-mentioned problems, a dimension measuring device has been proposed in which plural dimension measuring units are connected to a column having one bar graph and it is made possible to select a dimension measurement to display in a bar graph by a switch. As this device uses only one expensive bar graph, the effect of a reduction in cost is more significant compared to a case where plural bar graphs are used. By the way, there may be a case where a column is provided with plural bar graphs, more dimension measuring units (sections) in number than bar graphs are connected, and a dimension measurement to display is selected by a switch, however, for simplicity of explanation, an example in which a column is provided with one bar graph is taken here. Further, there may be a case where one dimension measuring unit has plural dimension measuring sections and in the following explanation, it is assumed that the dimension measuring section is connected to the column.

As described above, in a manufacturing process, it is important to confirm that a dimension measurement is within a tolerance and the upper limit value and the lower limit value of the tolerance are displayed in accordance with a bar graph. Japanese Unexamined Patent Publication (Kokai) No. 4-64011 has described a configuration for automatically producing a display in which the center value of a bar graph and the center value of a tolerance coincide with each other in a bar graph display. Due to this configuration, the display range by a bar graph can be effectively utilized.

SUMMARY OF THE INVENTION

As described above, in a conventional dimension measuring device in which plural dimension measuring units (sections) are connected to a column having one bar graph, which dimension measurement measured by which dimension measuring section is displayed is selected by a switch. When such a dimension measuring device is used in a manufacturing process etc., the switch is operated in accordance with the dimension measuring section in use and the dimensions of an object are measured after-the dimension measurement by the used dimension measuring section is displayed. Therefore, when the number of dimension measuring sections to be connected increases, the number of switch operations required for display selection increases and the operation becomes complicated. If the switch operation for display selection is not performed, the bar graph display does not change even if the dimensions of the object are measured by the dimension measuring section. In such a case, even if it is noticed that the bar graph display does not change when the dimensions of the object are measured by the dimension measuring section and it is found that the switch operation for display selection is not performed and measurement is performed after the switch operation, a problem arises that the working efficiency is degraded significantly.

As described above, Japanese Unexamined Patent Publication (Kokai) No. 4-64011 has described a configuration for automatically producing a display in which the center value of a bar graph and the center value of a tolerance coincide with each other in a bar graph display. According to Japanese Unexamined Patent Publication (Kokai) No. 4-64011, the setting of the upper limit value and the lower limit value of the tolerance are performed manually. However, the setting operation of the upper limit value and the lower limit value of the tolerance is complicated and it is required to improve the operability.

The present invention will solve the above-mentioned problems and a first object thereof is to realize a dimension measuring device that has improved operability when an expensive display device such as a bar graph is commonly used, and a second object thereof is to make it easy to set a tolerance display in accordance with a bar graph.

In order to realize the above-mentioned first object, a dimension measuring device in a first aspect of the present invention judges the effectiveness of dimension measurements and the necessity of display in accordance with the dimension measurements generated by each of plural dimension measuring sections and controls the display by a bar graph.

In other words, the dimension measuring device in the first aspect of the present invention is a dimension measuring device comprising plural dimension measuring sections for generating plural dimension measurements and a display section for displaying the dimension measurements generated by the plural dimension measuring sections, wherein the number of dimension measurements that the display section can display simultaneously is less than the number of dimension measurements generated by the plural dimension measuring sections and a display control section is comprised, which automatically selects a dimension measurement to display on the display section in accordance with the dimension measurements generated by the plural dimension measuring sections.

Methods for judging the effectiveness of dimension measurements and the necessity of display include various types, and some examples of them are explained below.

To a dimension measurement generated by each dimension measuring section, a measurement range that each display section can display is set in advance. For example, in a state of not measuring, the reading of dimension measurement is beyond one of edges of the range and when a state of measuring an object is brought about, the dimension measurement changes to a value in accordance with a dimension of the object. Therefore, if the dimension measurement is not within the measurement range, the state is judged not to be a measuring state and even if the state is a measuring state, it is not possible to display a measurement on the display section. Therefore, only the dimension measurements within the measurement range are judged to be effective and only these dimension measurements are displayed on the display section.

When the number of dimension measurements to display is one, that is, there exists only one dimension measurement within the measurement range, the dimension measurement is displayed. More generally, when the number of dimension measurements within the measurement range is less than the number of dimension measurements that the display section can display, all of the dimension measurements within the measurement range are displayed.

Next, a case is explained, where the number of dimension measurements within the measurement range is greater than the number of dimension measurements that the display section can display. In the following explanation, it is assumed that the number of dimension measurements that the display section can display is one.

An order of priority of display is set in advance to plural dimension measurements and when there exist plural dimension measurements within the measurement range, they are displayed according to the order of priority of display. For example, when eight dimension measuring sections are connected, an order of priority of display from first to eighth is set to the eight dimension measuring sections and a dimension measurement generated by the dimension measuring section with the highest priority of display is displayed among the dimension measurements within the measurement range. The setting of an order of priority of display is arbitrary and it is also possible to display the dimension measurement generated by the dimension measuring section with the lowest priority of display after setting the order of priority of display.

Further, it may also be possible to display the dimension measurements within the measurement range in order at predetermined time intervals.

Furthermore, it may also be possible to display the dimension measurement that has last entered the measurement range.

As described above, in the manufacturing process, it is necessary to confirm that the dimension measurements are within the measurement range. Normally, almost all of the dimension measurements of the portion of an object to be measured are within the measurement range, however, a dimension measurement outside the tolerance occurs on rare occasions and the portion of the object to be measured with such a dimension measurement is regarded as defective. In measurement, it is important to detect the occurrence of a defect and it is preferable to give priority to the display of a dimension measurement within the measurement range and outside the tolerance. Therefore, when there exists only one dimension measurement within the measurement range and outside the tolerance, the dimension measurement is displayed.

When there exist plural dimension measurements within the measurement range and outside the tolerance, they are displayed according to an order of priority of display or displayed in order at predetermined time intervals in the same manner as that described above. Alternatively, it may also be possible to display the dimension measurement whose difference from the tolerance is greatest among the dimension measurements within the measurement range and outside the tolerance.

When all of the dimension measurements within the measurement range are within the tolerance, they are displayed according to an order of priority of display or displayed in order at predetermined time intervals in the same manner as that described above. Alternatively, it may also be possible to display the dimension measurement whose difference from the tolerance is smallest.

Further, it is preferable for the display section to produce an explicit display of the displayed dimension measurement.

It may also be possible to provide a mode of displaying a predetermined dimension measurement specified by a switch etc. from the outside on the display section as in the conventional example and switch between the mode and a mode of automatically selecting a dimension measurement to display on the display section.

The present invention can be applied to a case where the display section has any type of display unit, however, it is particularly effective if applied to a case where a bar graph is used.

According to a first aspect of the present invention, it is made possible to automatically produce an effective display even if the number of display units is reduced compared to the number of dimension measuring sections. Due to this, the number of expensive display units can be reduced, therefore, the cost is reduced, the complicated switching operation is required less frequently, and the working efficiency is improved.

Next, in order to realize the above-mentioned second object, a dimension measuring device in a second aspect of the present invention automatically controls a display such that the center of a bar graph coincides with the center of a set tolerance and the tolerance range has the ratio set to the display range of the bar graph in accordance with the tolerance of the dimension measurements set in advance from the outside and the ratio of the tolerance range to the display range of the bar graph.

In other words, the dimension measuring device in the second aspect of the present invention is a dimension measuring device comprising a bar graph for displaying a dimension measurement and a tolerance range display showing the tolerance range of the dimension measurement and being characterized in that the tolerance of the dimension measurement is set from the outside, the ratio of the tolerance range to the display range of the bar graph is set from the outside or the ratio is stored in advance in the device as a fixed value, and the display control section automatically controls the display such that the center of the bar graph coincides with the center of the set tolerance and the tolerance range has the ratio set to the display range of the bar graph.

Besides the above-mentioned automatic setting mode, it may also be possible to provide a selectable mode for manually adjusting, as conventionally done, the display range of a bar graph and the positions of the upper limit value and the lower limit value of a tolerance.

Alternatively, it may also be possible, without making the display setting of the tolerance range of the bar graph fully automatic, to set in advance plural conditions relating to the tolerance of each dimension measurement and the position of the tolerance range in the display range of the bar graph, select a condition from among the plural conditions set in advance in accordance with the tolerance of an input dimension measurement or the ratio of the tolerance range to the display range of the bar graph, which is input or stored in advance in the device as a fixed value, and automatically control the display based on the selected condition.

The upper limit value and the lower limit value of the tolerance may be displayed in the bar graph or displayed by a scale provided adjacent to the bar graph.

The bar graph is constituted of an LED or LCD and it is preferable for them to be capable of color display, and the color display makes it possible to display the upper limit value and the lower limit value of the tolerance in a color different from those used to display other portions of the bar graph.

According to the second aspect of the present invention, the complicated setting processing of the tolerance range (the upper limit value and the lower limit value) is no longer necessary and, therefore, the operability of the dimension measuring device is improved.

BRIEF DESCRIPTION OF THE DRAWINGS

The features and advantages of the invention will be more clearly understood from the following description taken in conjunction with the accompanying drawings, in which:

FIG. 7 is a flow chart showing a display operation of a column in an embodiment;

FIG. 8A and FIG. 8B are diagrams showing modification examples of a display operation;

DESCRIPTION OF THE PREFERRED EMBODIMENTS

Figure 1:
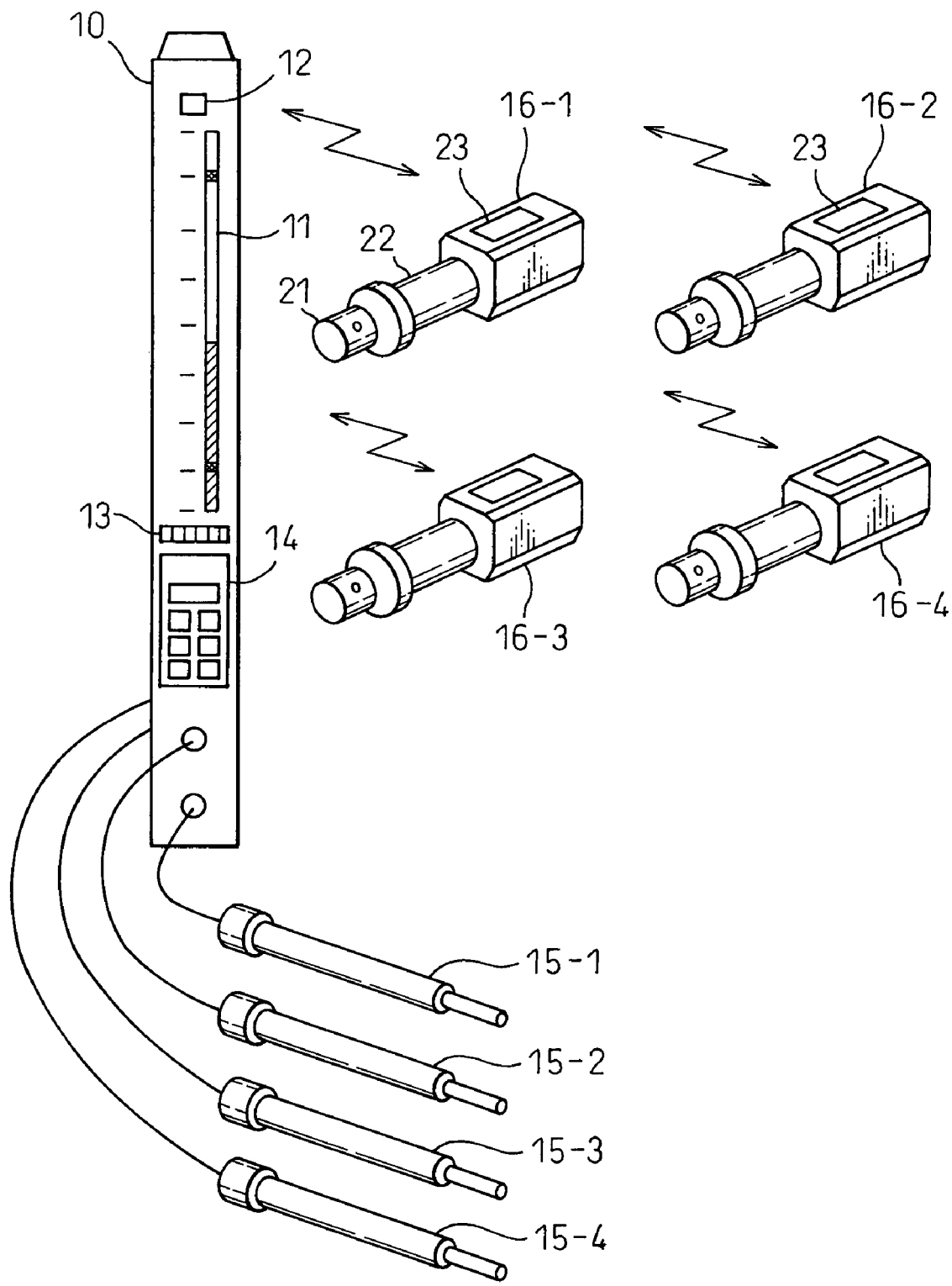
FIG. 1 is a diagram showing the entire configuration of a dimension measuring device of the present invention.

FIG. 1 is a diagram showing the entire configuration of a dimension measuring device in an embodiment of the present invention. As shown schematically, the dimension measuring device comprises a column 10, four pencil type gages 15-1 to 15-4 connected to the column 10 with a cable (cable communication), and four hand gages 16-1 to 16-4 connected to the column 10 by radio communication. The pencil type gages 15-1 to 15-4 detect the displacement of the probe at the front end with a differential transformer. The hand gages 16-1 to 16-4 are used for measuring an inner diameter and measures an inner diameter by detecting the displacement of two probes provided in the diameter direction with a differential transformer, and is driven by a battery. The column 10 comprises a bar graph 11, a gage number display unit 12 for displaying the gage number that displays a dimension measurement displayed in the bar graph 11, a dimension measurement display unit 13 for displaying a dimension measurement displayed in the bar graph 11 in digital, and a membrane keyboard 14 for performing various operations. The column 10 is provided with connectors for connecting the pencil type gages 15-1 to 15-4, two at the front surface and two at the back surface, and the back surface is further provided with various connectors such as a power source terminal, a power source switch, an RS-232C port, etc. On the top surface of the column 10, a radio circuit for performing radio communication with the hand gages 16-1 to 16-4 is provided.

Figure 2:
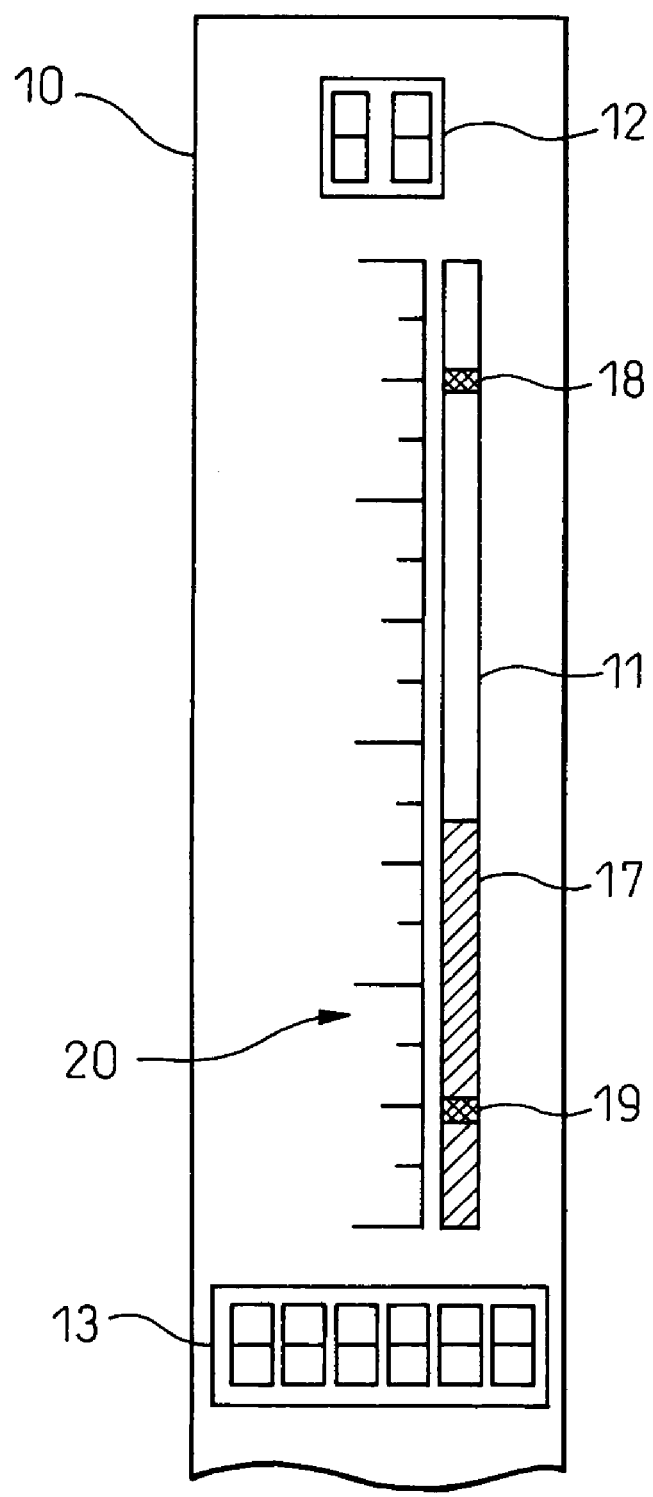
FIG. 2 is a diagram showing the detail of a bar graph display of a column.

FIG. 2 is a diagram showing the detail of the portion of the bar graph 11 at the front surface of the column 10. As shown schematically, the bar graph 11 is capable of color display and displays a dimension measurement by a bar 17 and at the same time, an upper limit value 18 and a lower limit value 19 of a tolerance in different colors. For example, the bar graph 11 displays in green when a dimension measurement is within the tolerance, displays in red when outside the tolerance, and displays the upper limit value 18 and the lower limit value 19 of the tolerance in orange. At the side of the bar graph 11, a scale 20 is marked.

Selection of an operation mode, direction of a dimension measurement to display from the outside, input of the measurement range and tolerance of each dimension measurement, etc., are performed by operating the membrane keyboard 14 while watching the display 12. These operations can also be performed by a computer for control (not shown) capable of communication via an RS-232C port. Further, the column 10 reads a dimension measurement from each gage and sends it to the computer for control via an RS-232C port according to the direction of an operator. A dimension measurement to be sent to the computer for control is not limited to the data displayed by the column 10 and, for example, a dimension measurement within the tolerance is read from the gage by the column 10 and sent to the computer for control without being displayed in the column 10.

Figure 3:
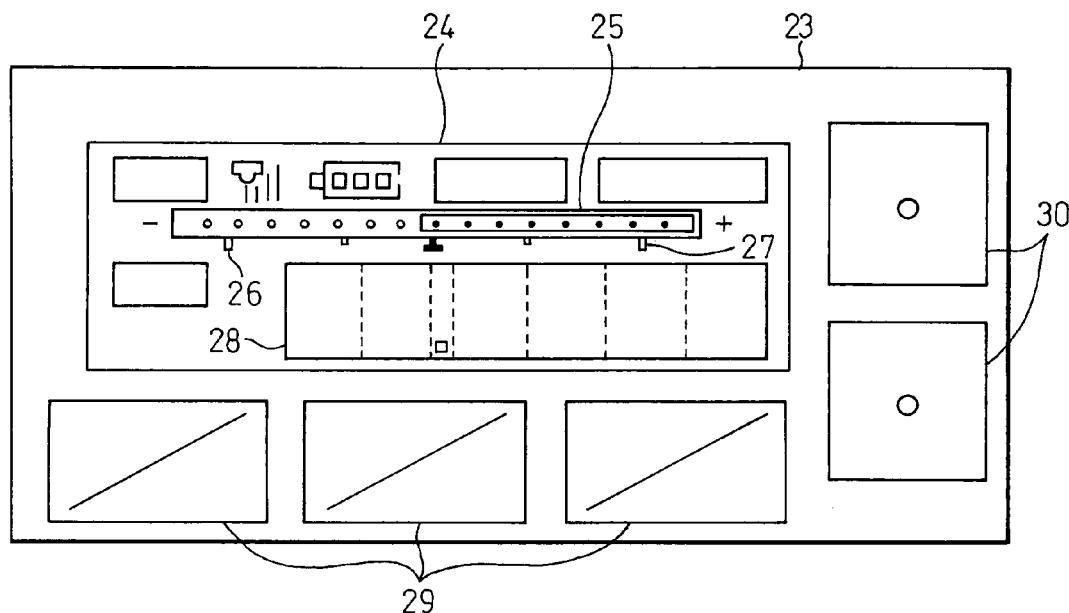
FIG. 3 is a diagram showing the operation section of a hand gage.

As shown in FIG. 1, each of the hand gages 16-1 to 16-4 has an operation section 23 constituted of a display unit of LCD and a membrane keyboard. FIG. 3 is a diagram showing the detail of the operation section 23 of the hand gage. As shown schematically, the operation section 23 has an LCD display unit 24 constituting a display section, a membrane keyboard 29, and a membrane keyboard with indicator 30. The LCD display unit 24 displays a bar graph 25 for displaying a dimension measurement of the hand gage, an upper limit value 27 and a lower limit value 26 of a tolerance, a digital value 28 of a dimension measurement, the charged state of the battery, radio communication conditions, a hold state of a dimension measurement, etc.

Selection of an operation mode, direction of a dimension measurement to display from the outside, input of the measurement range and the tolerance of each dimension measurement, etc., are performed by operating the membrane keyboard 29 and the membrane keyboard with indicator 30 while watching the LCD display unit 24. As described above, each hand gage has a display unit and a key for operation, therefore, it can be used independently without being connected to the column 10.

Figure 4:
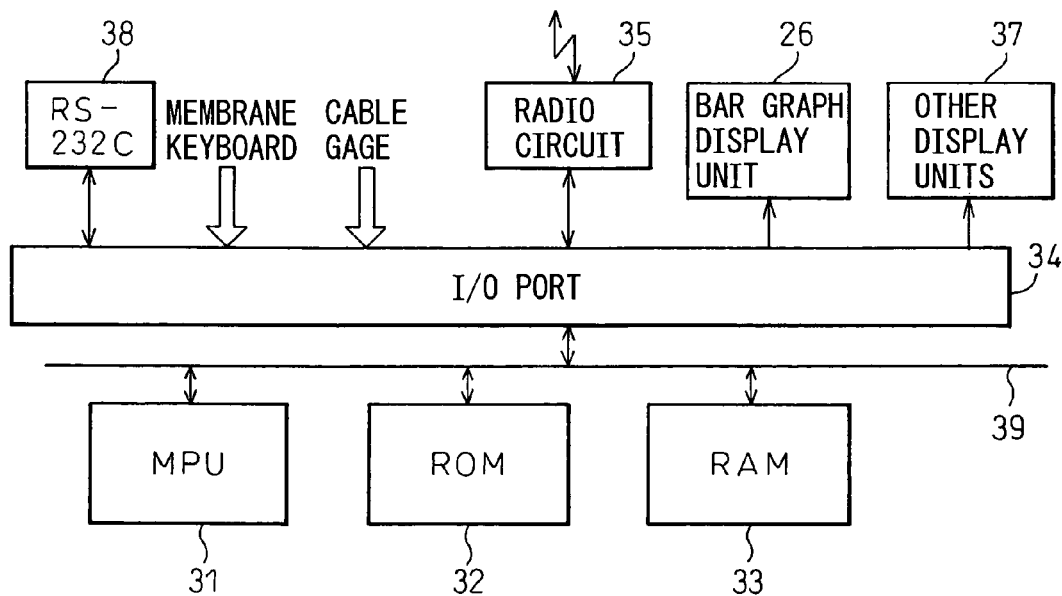
FIG. 4 is a diagram showing the configuration of a computer system of a column.

FIG. 4 is a diagram showing a configuration of a computer system for performing processing in a variety of ways including display processing. As shown schematically, a micro processor (MPU) 31, a ROM 32, a RAM 33, an input/output port 34, etc., are connected via a bus 39. To the input/output port 34, an RS-232C communication port 38 to be connected to a computer for control, the membrane keyboard, a radio circuit 35 for communication with the pencil type (cable) gages 15-1 to 15-4 and the hand gages 16-1 to 16-4, a bar graph display unit 26, another display unit 37, etc., are connected. Such a computer system is widely known and, therefore, a detailed explanation is omitted here.

Also the hand gages 16-1 to 16-4 are provided with a computer system for performing processing in a variety of ways, and its configuration is similar to the configuration in FIG. 4 except in that the RS-232C communication port 38 and the cable gages are not connected and an LDC display unit is connected as the bar graph display unit 26 and the other display unit 37 are connected.

Figure 5:
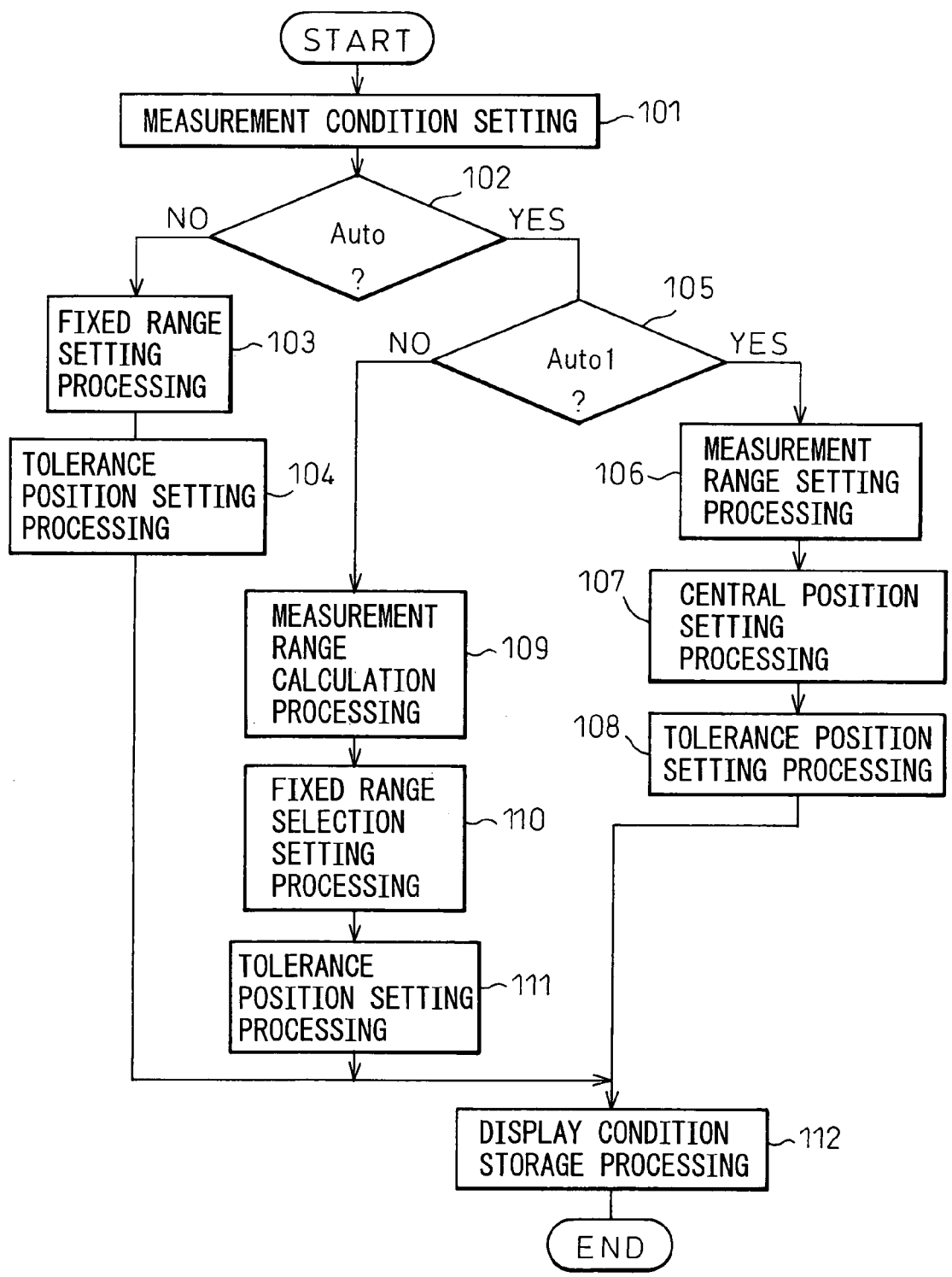
FIG. 5 is a flow chart for explaining tolerance setting processing in an embodiment.

Next, setting processing of a tolerance range in bar graph display of the column 10 and the hand gage is explained with reference to FIG. 5. Before measurement, in step 101, various conditions relating to measurement such as a tolerance range (an upper limit value and a lower limit value) and the ratio of the tolerance range to the bar graph display range are input. Inputting is performed for each gage (the pencil type (cable) gages 15-1 to 15-4 and the hand gages 16-1 to 16-4) and input conditions are stored. This inputting is performed by utilizing the membrane keyboard 14 and various displays or by utilizing a computer for control connected via the RS-232C. The ratio of the tolerance range to the bar graph display range may be stored in advance as a fixed value in the dimension measurement.

Next, in step 102, whether the mode is the fixed setting mode or the AUTO mode is judged. The dimension measurement in the present embodiment has the fixed setting mode for setting to a fixed measurement range of ±4, ±8, ±20, ±40, ±200, and ±400 μm and the AUTO mode for automatically setting a bar graph display in accordance with the input tolerance. In the case of the fixed setting mode, the procedure proceeds to step 103 where fixed range setting processing for associating the bar graph display range to a specified fixed measurement range is performed. Next, in step 104, the upper limit value and the lower limit value of the input tolerance are displayed in a bar graph. In step 104, it is also possible to set the upper limit value and the lower limit value of the tolerance in accordance with the bar graph by the method as described in Japanese Unexamined Patent Publication (Kokai) No. 4-64011. After this, the procedure proceeds to step 112.

The dimension measurement in the present embodiment has two modes, that is, AUTO1 and AUTO2. When the mode is judged to be the AUTO mode in step 102, the AUTO mode is judged in step 105. When AUTO1 is specified, in steps 106 and 107, the measurement range and the central position in the bar graph display are calculated by the following expression in accordance with input upper limit value U and lower limit value L and the ratio Q of the tolerance range to the bar graph display range.

Measurement range=$\pm(U-P)/2Q$

Central position=$(U+P)/2$

For example, when the number of elements of the bar graph is 100 and the ratio Q of the tolerance range (upper limit value−lower limit value) is 80%, the number of elements within the tolerance range is 80. Similarly, when the number of elements of the bar graph is 80 and Q is 75%, the number of elements within the tolerance range is 60.

In step 108, processing for setting the upper limit value and the lower limit value of the tolerance is performed in accordance with Q. Here, if the ratio Q of the tolerance range (upper limit value−lower limit value) is the same, the upper limit value and the lower limit value in the bar graph are the same. After this, the procedure proceeds to step 112.

When the AUTO mode is judged to be AUTO2 in step 105, in step 109, the measurement range is calculated from the input upper limit value U and lower limit value L and the ratio Q of the tolerance range to the bar graph display range. Then, in step 110, a measurement range is selected and set from the fixed ranges, within which the calculated measurement range is included. For example, if the calculated measurement range is ±60 μm, the measurement range of ±80 μm is selected. In step 111, the upper limit value U and lower limit value L are set in the bar graph. After this, the procedure proceeds to step 111.

In step 112, the display conditions set as described above are stored. Such setting is performed for each gage. The dimension measuring device in the present invention, the plural gages share the bar graph display of the column 10 and the dimension measurement to display is selected in accordance with the value. For the selection and the display of the selected dimension measurement, the input upper limit value U, lower limit value L, and measurement range are used, therefore, these conditions are stored for each gage.

If the above-mentioned conditions are set, it is possible to control a display by the method described in Japanese Unexamined Patent Publication (Kokai) No. 4-64011. Due to this, the center of the bar graph coincides with the center of the tolerance and the difference between the upper limit value and the lower limit value of the tolerance to the display range of the bar graph becomes the predetermined ratio Q, therefore, it becomes possible to realize an easy-to-see display that effectively utilizes the display range of the bar graph. By the way, the display of the bar graph is also the same in the column 10 and the hand gages 16-1 to 16-4.

Figure 6:
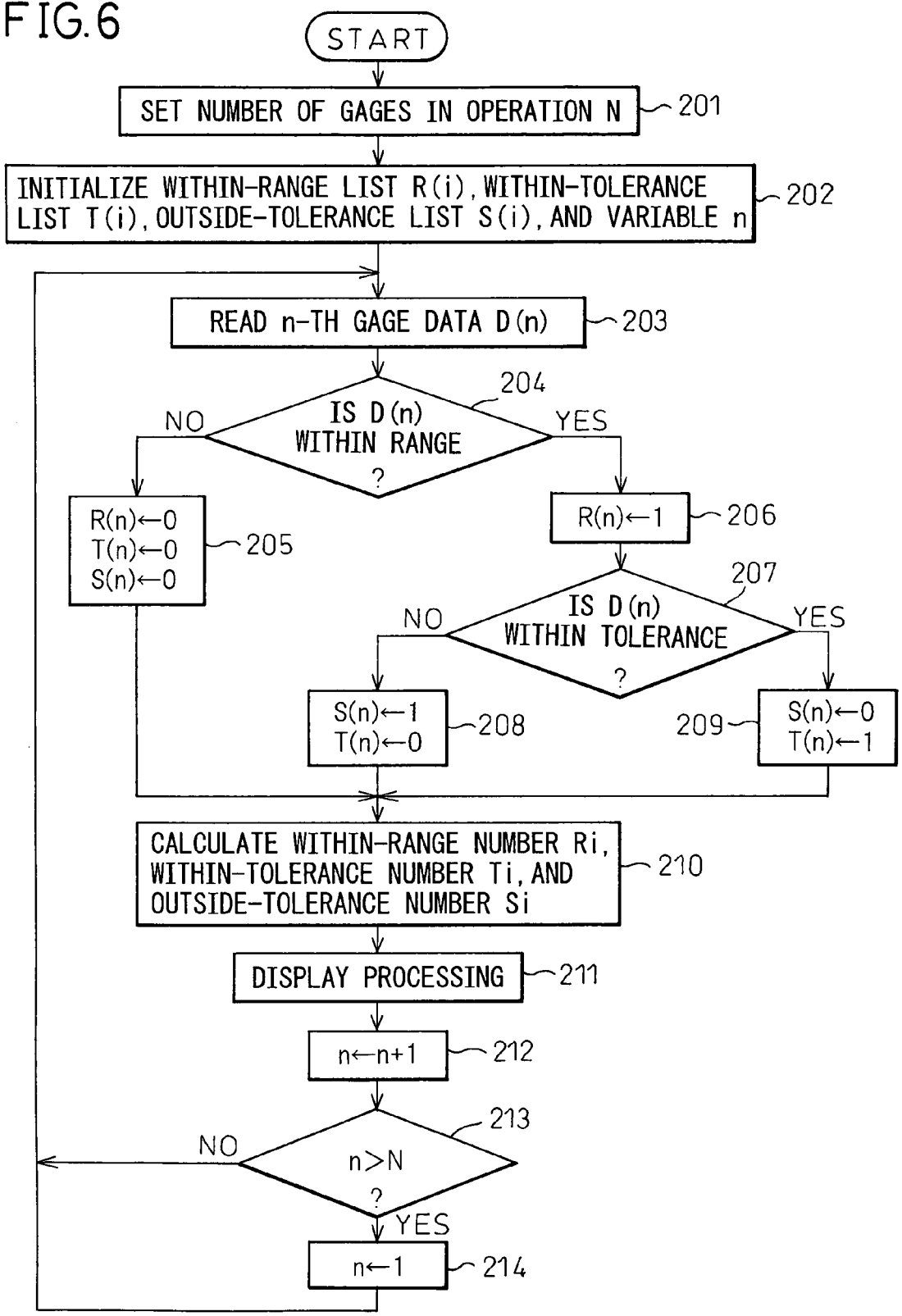
FIG. 6 is a flow chart showing a display operation of a column in an embodiment.

FIG. 6 and FIG. 7 are flow charts showing processing for electing the dimension measurement to display in the bar graph in the column 10 in accordance with the value.

First, the algorithm of selection is briefly explained.

As described above, to a dimension measurement generated by each dimension measuring section, a measurement range that each display section can display is set in advance, and if the dimension measurement is not within the measurement range, the state is judged to be a state of not measuring, and only the dimension measurements within the measurement range are displayed in the bar graph. Further, an order of priority of display is set in advance to the dimension measurements of the eight gages.

When there exists only one dimension measurement within the measurement range, it is displayed. When there exist plural dimension measurements within the measurement range, they are displayed according to an order of priority of display. For example, if eight gages are connected, an order of priority of display from first to eighth is set to the eight gages and a dimension measurement generated by the dimension measuring section with the highest priority of display is displayed among the dimension measurements within the measurement range. The setting of the order of priority of display is set in advance with a membrane keyboard etc.

When all of the dimension measurements within the measurement range are within the tolerance, they are displayed according to an order of priority of display in the same manner as described above.

In step 201, the number of gages in operation N is set. In the present embodiment, the four pencil type gages 15-1 to 15-4 are connected with a cable and the four hand gages 16-1 to 16-4 are connected by radio, and the maximum of N is eight. When there is a gage not in use, N is reduced accordingly.

In step 202, a within-range list R (i), a within-tolerance list T (i), an outside-tolerance list S (i), and a variable n are initialized.

In step 203, the n-th gage data D (n) is read. In step 204, whether the gage data D (n) is within the measurement range is judged. If it is not within the measurement range, the procedure proceeds to step 205 where 0 is set to R (n), T (n), and S (n). In these lists, when R (n)=0, the n-th dimension measurement is outside the measurement range and R (n)=1 means that the n-th dimension measurement is within the measurement range. Similarly, when T (n)=0, the n-th dimension measurement is outside the tolerance and T (n)=1 means that the n-th dimension measurement is within the tolerance. When S (n)=0, the n-th dimension measurement is outside the measurement range or within the tolerance and S (n)=1 means that the n-th dimension measurement is within the measurement range and outside the tolerance. After step 205, the procedure proceeds to step 210.

In step 204, if D (n) is judged to be within the measurement range, in step 206, 1 is set to R (n) and in step 207, whether D (n) is within the tolerance is judged. If it is judged to be outside the tolerance, in step 208, 1 is set to S (n) and 0 is set to T (n), and then the procedure proceeds to step 210. If it is judged to be within the tolerance, in step 209, 0 is set to S (n) and 1 is set to T (n), and then the procedure proceeds to step 210.

In step 210, within-range number Ri, which is the number of dimension measurements within the measurement range, within-tolerance number Ti, which is the number of dimension measurements within the tolerance, and outside-tolerance number Si, which is the number of dimension measurements within the measurement range and outside the tolerance are calculated.

In step 211, display processing is performed. This processing is explained with reference to the flow chart in FIG. 7.

In step 221, whether Ri is 0, that is, whether there exists a dimension measurement within the measurement range is judged. When Ri is 0, there is no data to display, therefore, the procedure proceeds to step 222 where the display is cleared, and then proceeds to step 212 in FIG. 6.

When Ri is judged not to be 0 in step 221, the procedure proceeds to step 223 and whether Ri is 1 is judged. When Ri is 1, there is a piece of data to display, therefore, the procedure proceeds to step 224 where data D (i) whose R (i)=1, that is, the value is 1 in the within-range list, is displayed in a bar graph, and that it is the dimension measurement of the i-th gage is displayed and the data D (i) is displayed in a digital value, then the procedure proceeds to step 212 in FIG. 6.

When Ri is judged not to be 1 in step 223, that is, plural dimension measurements are judged to exist within the measurement range, the procedure proceeds to step 225 and whether Si is 0 is judged. When Si is not 0, that is, when there exists a dimension measurement within the measurement range and outside the tolerance, further in step 226, whether Si is 1 is judged. When Si is 1, there exists only one dimension measurement within the measurement range and outside the tolerance, therefore, the procedure proceeds to step 227 where a dimension measurement whose S (i)=1, that is, a dimension measurement within the measurement range and outside the tolerance is displayed in a bar graph and further, that it is the dimension measurement of the i-th gage is displayed and the data D (i) is displayed in a digital value, then the procedure proceeds to step 212 in FIG. 6.

When Si is judge not to be 1 in step 226, that is, when it is judged that there exist plural dimension measurements within the measurement range and outside the tolerance, the procedure proceeds to step 228 where the smallest i is determined among the dimension measurements whose value of the outside-tolerance list S (i) is 1, and then the procedure proceeds to step 230.

On the other hand, when Si is judged to be 0 in step 225, it means that there exists no dimension measurement within the measurement range and outside the tolerance, and there exist plural dimension measurement within the tolerance. Therefore, the procedure proceeds to step 229 where the smallest i is determined among the dimension measurements whose value of the within-tolerance list T (i) is 1, and then the procedure proceeds to step 230.

In step 230, the dimension measurement D (i) of the i-th gage is displayed in a bar graph and, further, the data D (i), which is the dimension measurement of the i-th gage, is displayed in a digital value, and then the procedure proceeds to step 212 in FIG. 6.

In step 212 in FIG. 6, the variable n is incremented by 1 and in step 213, whether n is greater than the number of gages in operation N is judged. If n is not greater than N, the procedure returns to step 203. If n is greater than N, the procedure proceeds to step 214 where the variable n is set to 1, then returns to step 203.

After this, steps 203 to steps 214 are repeated and steps 201 and 202 are performed as the occasion may demand.

In the present embodiment, when, for example, all of the eight gages are used and the same dimension measurement is displayed repeatedly, the period at which the display is updated is eight times the time taken for performing steps 203 to 214. As the time taken for performing steps 203 to 214 is very short, it is possible to set the period at which the display is updated to a length that human beings cannot sense.

The bar graph display processing is described in, for example, Japanese Unexamined Patent Publication (Kokai) No. 4-64011 and Japanese Unexamined Patent Publication (Kokai) No. 7-334113, and it is well known, therefore, detailed examination is omitted here.

Further, in the above explanation, in which a dimension measurement to display in a bar graph is automatically selected, however, it is also possible to select such an automatic display mode and a gage that displays a dimension measurement, and select a fixed display mode in which the dimension measurement of the gage is displayed by the operation of the membrane keyboard. As the fixed display mode is the same as that of the conventional one, an explanation is not given here.

The display operation in the embodiment of the present invention is explained above, however, various modification examples are possible.

For example, in the example described above, the order of priority of display is determined in advance and when there exist plural dimension measurements to display, the dimension measurement to display is selected according to the order of priority of display, however, it may also be possible to display a dimension measurement with high priority of display by judging the priority of display from the dimension measurement. FIG. 8A and FIG. 8B are flow charts showing processing in the modification example: FIG. 8A shows processing in step 231 performed instead of step 228 in FIG. 7 and FIG. 8B shows processing in step 232 performed instead of step 229 in FIG. 7.

In a manufacturing process, normally, almost all of the dimension measurements of the portion of an object to be measured are within a tolerance, however, on rare occasions, a dimension measurement that is not within the tolerance occurs and the portion of the object to be measured corresponding to this measurement is judged to be defective. Therefore, it is preferable to display a defective dimension measurement in order to prevent the occurrence of a defective portion. Then, as shown in FIG. 8A, when it is judged that there exist plural dimension measurements within the measurement range and outside the tolerance in step 231, then, in step 231, i when the difference between the tolerance and the gage data D (i) is maximum is determined in the outside-tolerance list S (i). In other words, selection is made such that a dimension measurement the difference of which from the tolerance is large is displayed with priority.

Further, as shown in FIG. 8B, when it is judged that all of the dimension measurements of the object to be measured are within the tolerance in step 225, then, i when the difference between the tolerance and the gage data D (i) is minimum is determined in the within-tolerance list T (i). In other words, when plural dimension measurements within the tolerance are to be displayed, selection is made such that a dimension measurement the difference of which from the tolerance is minimum is displayed.

Figure 9A:
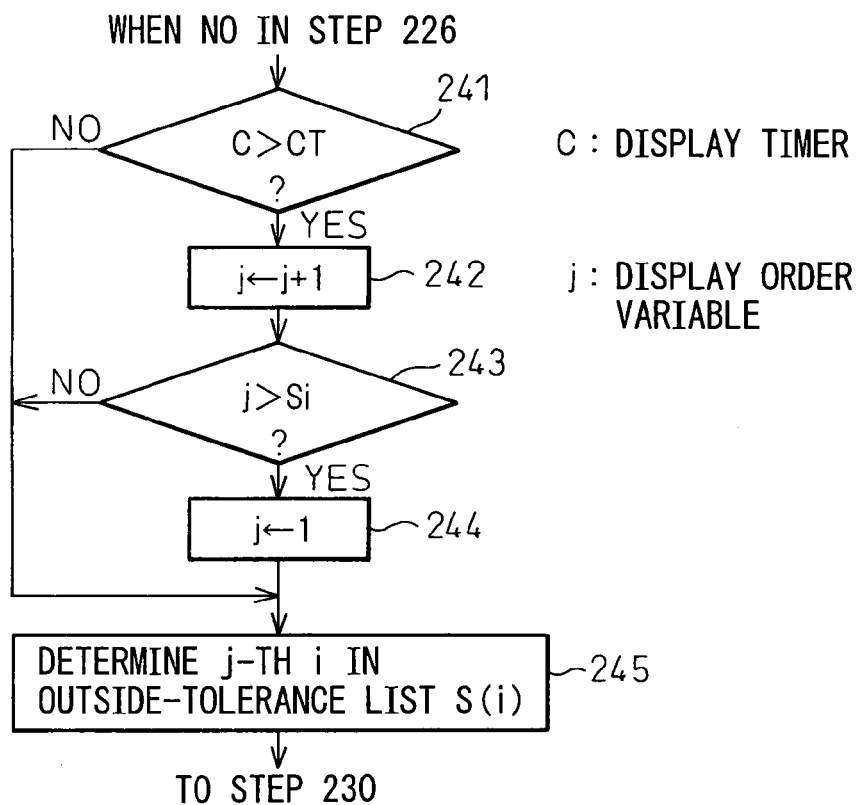
FIG. 9A and FIG. 9B are diagrams showing modification examples of a display operation.
Figure 9B:
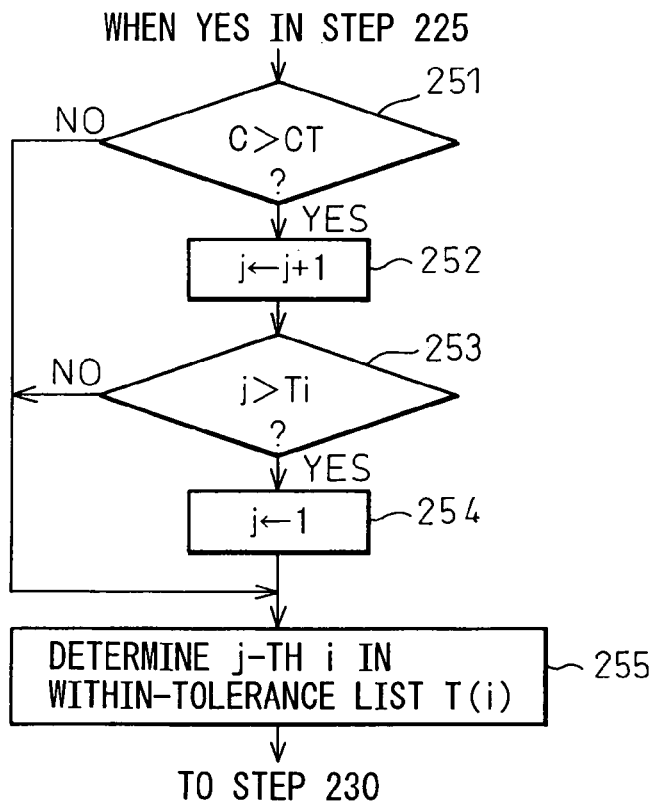

When there exist plural dimension measurements to display, it may also be possible to display the plural dimension measurements to display in order at predetermined time intervals. FIG. 9A and FIG. 9B are flow charts showing the processing of the modification example: FIG. 9A shows the processing of steps 241 to 245 performed instead of step 228 in FIG. 7 and FIG. 9B shows the processing of steps 251 to 255 performed instead of step 229 in FIG. 7. In this processing, a display timer C and a display order variable j are used.

As shown in FIG. 9A, when it is judged that there exist plural dimension measurements within the measurement range and outside the tolerance in step 226, whether the timer C exceeds a threshold value CT is judged in step 241 and if the timer C does not exceed the threshold value CT, it is not necessary to update the gage that displays the dimension measurement, therefore, the procedure proceeds to step 245. If the timer C exceeds the threshold value CT, j is incremented by 1 in step 242 and in step 243, whether j exceeds the number of dimension measurements to display Si, that is, whether j exceeds the number of dimension measurements within the measurement range and outside the tolerance is judged. If j does not exceed Si, the procedure proceeds to step 245 and if j exceeds Si, j is set to 1 in step 244 and the procedure proceeds to step 245. In step 245, the j-th one in the outside-tolerance list S (i) is determined as i to display, and the procedure proceeds to step 230.

Further, as shown in FIG. 9B, when it is judged in step 225 that all of the dimension measurements of the object to be measured are within the tolerance, whether the timer C exceeds the threshold value CT is judged in step 251, and if C does not exceed CT, it is not necessary to update the gage that displays the dimension measurement, therefore, the procedure proceeds to step 255. If the timer C exceeds the threshold value CT, j is incremented by 1 in step 252 and whether j exceeds the number of dimension measurements to display Ti, that is, the number of dimension measurements within the tolerance, is judged in step 253. If j does not exceed Ti, the procedure proceeds to step 255, and if j exceeds Ti, j is set to 1 in step 254 and the procedure proceeds to step 245. In step 245, the j-th one in the within-tolerance list (i) is determined as the object to display i and the procedure proceeds to step 230.

The processing of selecting the dimension measurements to display is explained as above, however, it is easily understood, by those in the field, that other various modification examples are possible.

Figure 10A:
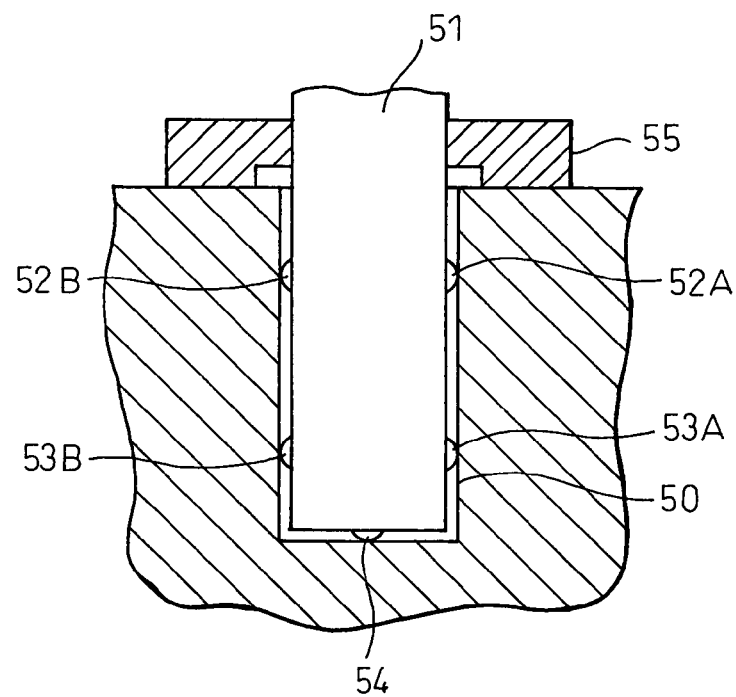
FIG. 10A and FIG. 10B are diagrams showing modification examples of a gage.

Further, each gage shown in the above embodiment generates only one dimension measurement, however, there is a case where one gage simultaneously generates plural dimension measurements. FIG. 10A shows an example of such a gage. The gage shown in FIG. 10A is a gage for measuring the depth of a hole 50 and the inner diameters at two points different in depth. As shown schematically, a head 51 of the gage is provided with two pairs of probes 52A and 52B, and 53A and 53B at different positions in the axial direction and further a probe 54 is provided at its front end. The head 51 is provided with a member 55 that comes into contact with the top surface of the hole and by detecting the displacement of the probe 54, the depth of the hole can be measured.

When the gage in FIG. 10A is used as a gage in the above embodiment, the processing explained in the above embodiment is performed on a dimension measurement that is a dimension measurement generated by another gage plus three dimension measurements generated by the gage in FIG. 10A. Further, when the gage in FIG. 10A has the operation section shown in FIG. 3, the three dimension measurements are displayed on the LCD display unit 24 in accordance with the values as explained above.

Figure 10B:
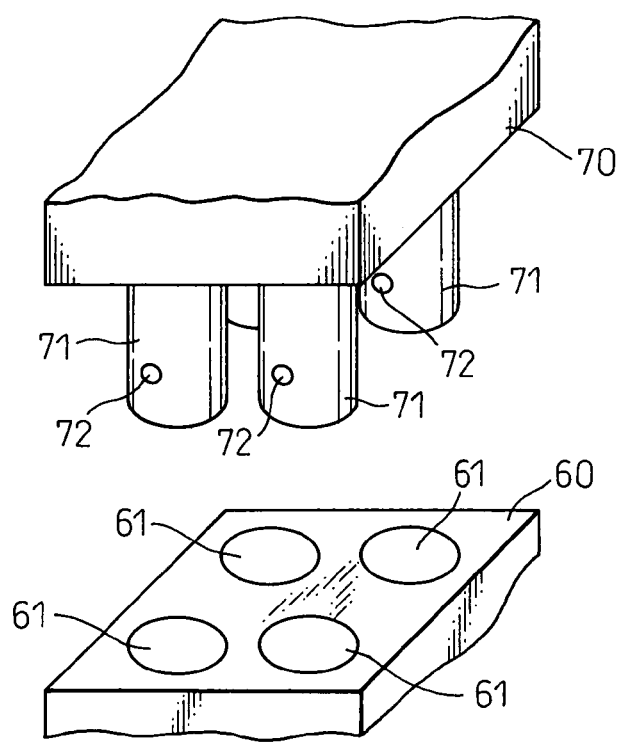

When the hole diameter of a cylinder head is measured, there is a device for measuring plural hole diameters simultaneously by combining plural inner diameter gages as shown in FIG. 10B. In this case also, it is only necessary to perform processing of each dimension measurement in the same manner as that described above.

Figure 11:
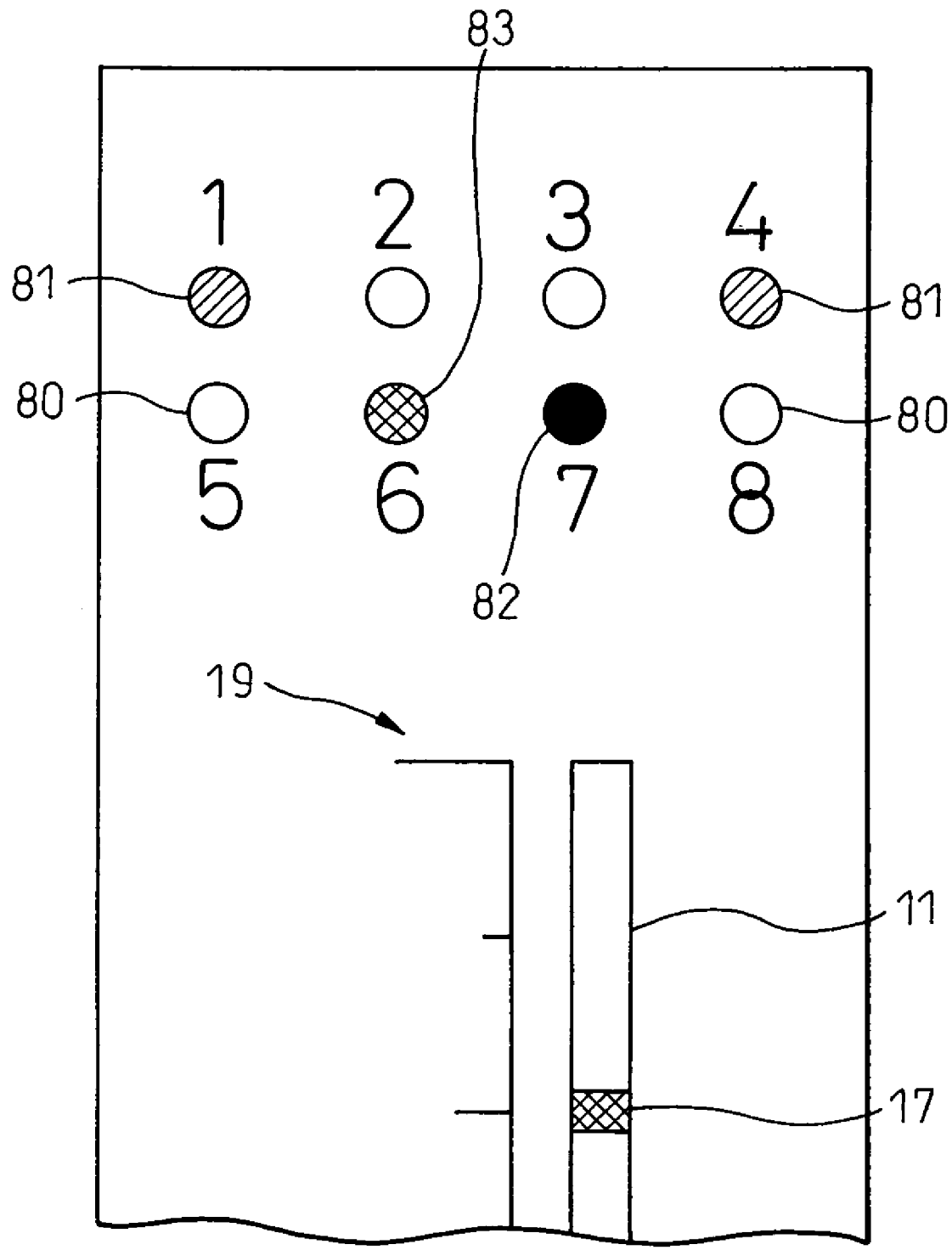
FIG. 11 is a diagram showing a modification example of a display in a column.

In the above-mentioned embodiment, the number of the gage that displays a dimension measurement in the bar graph 11 is displayed in the gage number display unit 12 provided in the column 10, however, as shown in FIG. 11, for example, it may also be possible to provide indicators in accordance with the number of connectable gages and indicate the respective states of the gages by the respective indicators. For example, an indicator 80 is not lit, indicating the generated dimension measurement is outside the measurement range, an indicator 81 is continuously lit in green, indicating the generated dimension measurement is within the tolerance, and an indicator 82 is continuously lit in red, indicating the generated dimension measurement is within the measurement range and outside the tolerance. An indicator 83 flashes in red, indicating the generated dimension measurement currently display in the bar graph and that the generated dimension measurement is within the measurement range and outside the tolerance.

Figure 12:
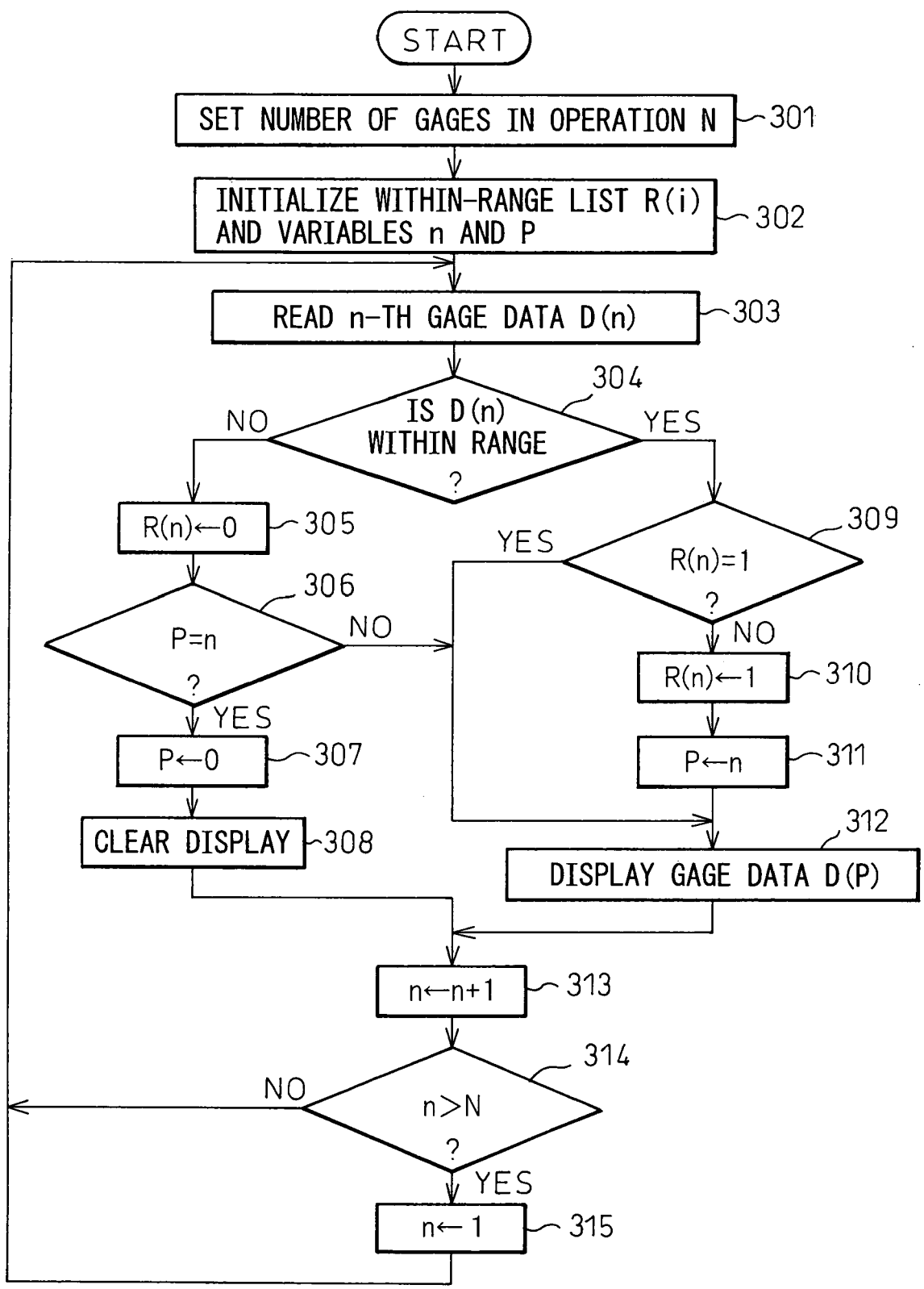
FIG. 12 is a flow chart showing another display operation of a column.

FIG. 12 is a flow chart showing the processing of selecting a dimension measurement to display in another method and displaying it. This selection method displays only the dimension measurement that has last entered the measurement range, that is, only the most recent dimension measurement among the dimension measurements within the measurement range. This selection method is not influenced by whether or not the dimension measurement is within the tolerance.

In step 301, the number of gages in operation N is set.

In step 302, the within-range list R (i) and the variable n are substituted with 1 and p is substituted with 0 for initialization. The variable p indicates the gage number of the displayed dimension measurement.

In step 303, the n-th gage data D (n) is read. In step 304, whether the gage data D (n) is within the measurement range is judged. If it is not within the measurement range, the procedure proceeds to step 305 where 0 is set to R (n), and then the procedure proceeds to step 306. In step 306, whether the variable p is n is judged and if the variable p is n, the procedure proceeds to step 307. In this case, as the most recent dimension measurement has gone out of the measurement range and there is no dimension measurement to display, therefore, p is substituted with 0 in step 307, the display is cleared in step 308, and the procedure proceeds to step 313. If the variable p is n in step 306, the procedure proceeds to step 312.

In step 304, if D (n) is judged to be within the measurement range, in step 309, whether R (n) is 1 is judged. When R (n) is 1, it means that the dimension measurement is already within the measurement range, therefore, the procedure proceeds to step 312. When R (n) is not 1, it means that the dimension measurement is one that has newly entered the measurement range, that is, the most recent dimension measurement, therefore, R (n) is substituted with 1 in step 310, the variable p is substituted with n in step 311, then the procedure proceeds to step 312.

In step 312, the p-th gage data D (p) shown by the variable p is displayed. Steps 313 to 315 are the same processing as the flow chart in FIG. 6.

By the processing described above, the dimension measurement that has last entered the measurement range, that is, the most recent dimension measurement is displayed.

Figure 13:
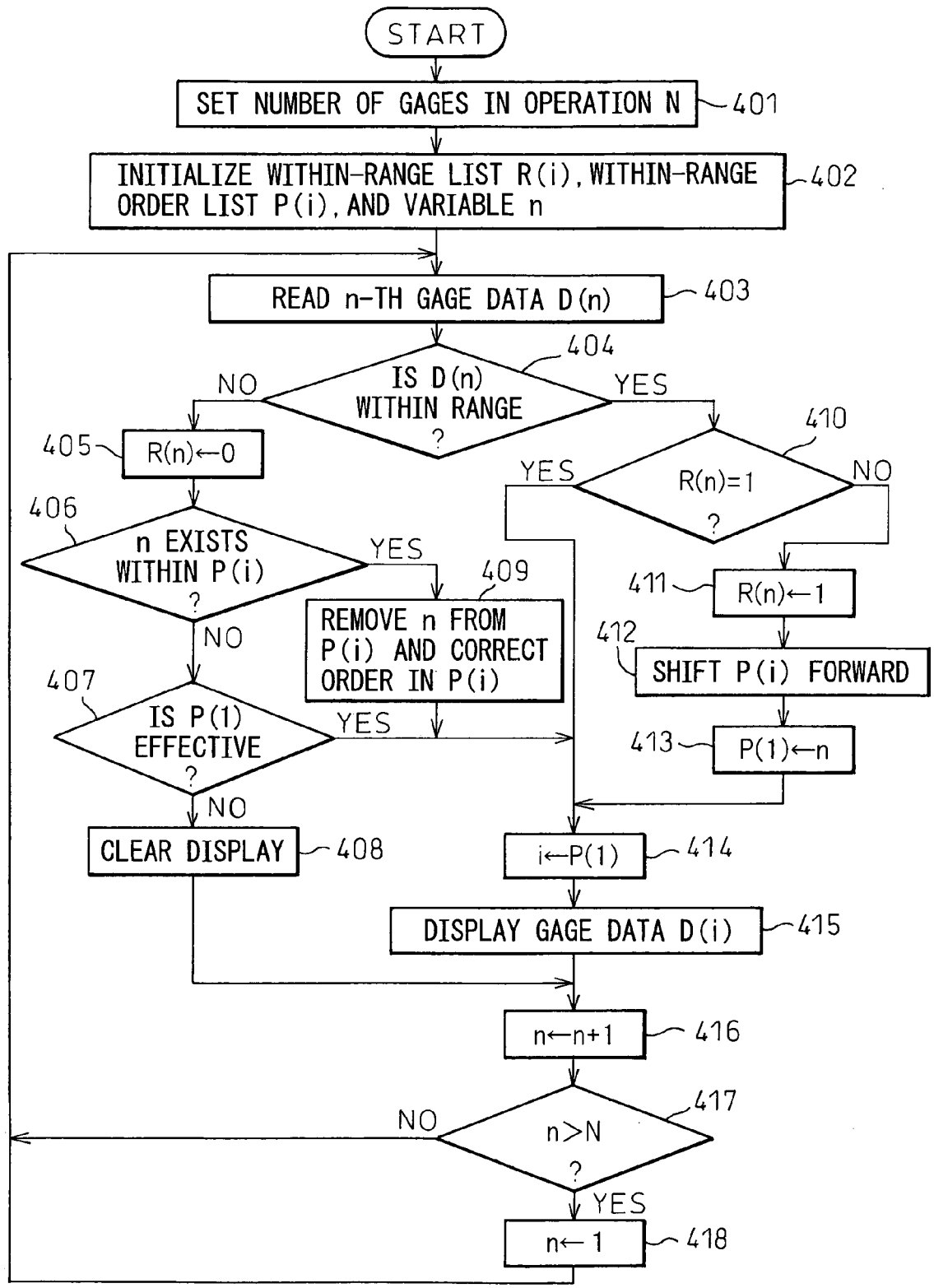
FIG. 13 is a flow chart showing another display operation of a column.

According to the flow chart in FIG. 12, the most recent dimension measurement is displayed, however, if the most recent dimension measurement has gone out of the measurement range, no dimension measurement is displayed even if there exists another dimension measurement within the measurement range. Therefore, a modification example was suggested that, when the most dimension measurement has gone out of the measurement range, the dimension measurement that has last entered the measurement range among the remaining dimension measurements within the measurement range. FIG. 13 is a flow chart showing the processing of the modification example.

In step 401, the number of gages in operation N is set.

In step 402, the within-range list R (i), the within-range order list P (i), and the variable n are initialized. The within-range order list P (i) shows the order of entering the measurement range and P (1) shows the number of the dimension measurement that has last entered the measurement range.

In step 403, the n-th gage data D (n) is read. In step 404, whether the gage data D (n) is within the measurement range is judged. If it is not within the measurement range, the procedure proceeds to step 405 where 0 is set to R (n) and then the procedure proceeds to step 406. In step 406, whether n exists in the within-range order list P (i) is judged. When it does not exist in P (i), the current gage data D (n) is not within the measurement range originally, the procedure proceeds to step 407. In step 407, whether P (1) is effective, that is whether a dimension measurement exists within the measurement range is judged. When P (1) is not effective, there is no gage data to display, therefore, the display is cleared in step 408, and then the procedure proceeds to step 416. When P (1) is effective, there is data to display, therefore, the procedure proceeds to step 414.

In step 406, when n exists in P (i), it is necessary to remove n from P (i), therefore, n is removed from P (i) in step 409 and the order in P (i) is corrected. In this processing, for example, n is removed from the place of n in the order in P (i) and the latter places in the order are shifted forward. After this, the procedure proceeds to step 414.

In step 404, when the gage data D (n) is judged to be within the measurement range, whether R (n) is 1 is judged in step 410. When R (n) is 1, it is already a dimension measurement within the measurement range, therefore, the procedure proceeds to step 414. When R (n) is not 1, the gage data D (n) is the most recent dimension measurement, therefore, R (n) is substituted with 1 in step 411, P (i) is shifted backward by 1 in step 412, the vacant P (1) is substituted with n in step 413, and the procedure proceeds to step 414. Due to this, P (1) that shows the number to display is caused to show the most recent dimension measurement.

In step 414, P (1) is substituted with i, the gage data D (i) is displayed in step 415, and the procedure proceeds to step 416.

Steps 416 to 418 are the same as those in the flow chart in FIG. 12.

As described above, according to the present invention, it is possible to realize a dimension measuring device excellent in operability when displaying plural dimension measurements in a graphic unit such as a bar graph display unit even if an attempt is made to reduce the cost by using one expensive bar graph display unit in common.

I claim:

1. A dimension measuring device comprising:
    a plurality of dimension measuring sections for generating plural dimension measurement values;
    a display section for displaying at least one of the dimension measurement values generated by the plurality of dimension measuring sections, wherein the number of dimension measurement values the display section can display simultaneously is less than the number of dimension measurement values generated by the plural dimension measuring sections; and
    a display control section for automatically selecting the at least one of the dimension measurement values independent of a user input to display on the display section in accordance with the dimension measurement values generated by the plural dimension measuring sections,
    wherein the automatic selection of the at least one of the dimension measurement values is in accordance with dimension measurement values generated by the dimension measuring sections and a predetermined value.

2. The dimension measuring device as set forth in claim 1, wherein the display section produces a display showing the displayed dimension measurement.

3. The dimension measuring device as set forth in claim 1 further comprising means for changing between a mode for automatically selecting a dimension measurement to display on the display section and a mode for displaying a predetermined dimension measurement on the display section.

4. The dimension measuring device as set forth in claim 1, wherein the display section comprises a bar graph for displaying a dimension measurement.

5. The dimension measuring device as set forth in claim 4, wherein
a tolerance for dimension measurements is set and a ratio of a tolerance range to a display range of the bar graph is set or stored in advance in the device as a fixed value; and
the display control section is configured to automatically control the display such that a center of the bar graph coincides with a center of the set tolerance and the ratio of the tolerance range is set to the display range of the bar graph.

6. The dimension measuring device as set forth in claim 5, further comprising means for manually adjusting a display range of the bar graph and positions of an upper limit value and a lower limit value of a tolerance.

7. The dimension measuring device as set forth in claim 5, wherein the bar graph displays an upper limit value and a lower limit value of the tolerance.

8. A dimension measuring device comprising:
a plurality of dimension measuring sections for generating plural dimension measurements;
a display section for displaying at least one of the dimension measurements generated by the plurality of dimension measuring sections, wherein the number of dimension measurements the display section can display simultaneously is less than the number of dimension measurements generated by the plural dimension measuring sections; and
a display control section for automatically selecting the at least one of the dimension measurements independent of a user input to display on the display section in accordance with the dimension measurements generated by the plural dimension measuring sections, wherein the display control section is configured to select a dimension measurement to display on the display section from dimension measurements within a predetermined measurement range.

9. The dimension measuring device as set forth in claim 8, wherein the display control section is configured to display all of the dimension measurements within the measurement range when the number of dimension measurements within the measurement range is equal to or less than the number of dimension measurements the display section can display.

10. The dimension measuring device as set forth in claim 8, wherein an order of priority of display for the plural dimension measurements is set in advance; and the display control section is configured to select a dimension measurement from the dimension measurements to display within the measurement range according to the set order of priority of display, when a number of dimension measurements within the measurement range is greater than the number of dimension measurements the display section can display.

11. The dimension measuring device as set forth in claim 8, wherein the display control section is configured to display at least a part of the dimension measurements within the measurement range at predetermined time intervals, when a number of dimension measurements within the measurement range is greater than the number of dimension measurements the display section can display.

12. The dimension measuring device as set forth in claim 8, wherein the display control section is configured to display a dimension measurement that has last entered the measurement range, when a number of dimension measurements within the measurement range is greater than the number of dimension measurements the display section can display.

13. The dimension measuring device as set forth in claim 8, wherein
a tolerance is set in advance for each dimension measurement; and
the display control section is configured to display all of the dimension measurements within the measurement range and outside of the tolerance, when there are at least two dimension measurements within the measurement range and the number of dimension measurements within the measurement range and outside of the tolerance is equal to or less than the number of dimension measurements the display section can display.

14. The dimension measuring device as set forth in claim 8, wherein
an order of priority of display is set in advance for the plural dimension measurements;
a tolerance is set in advance for each dimension measurement; and
the display control section is configured to display a dimension measurement the dimension measurements within the measurement range and outside of the tolerance according to the order of priority of display, when there are at least two dimension measurements within the measurement range and the number of dimension measurements within the measurement range and outside of the tolerance is greater than the number of dimension measurements the display section can display.

15. The dimension measuring device as set forth in claim 8, wherein
a tolerance is set in advance for each dimension measurement; and
the display control section is configured to display at least a part of the dimension measurements within the measurement range and outside of the tolerance at predetermined time intervals, when there are at least two dimension measurements within the measurement range and the number of dimension measurements within the measurement range and outside of the tolerance is greater than the number of dimension measurements the display section can display.

16. The dimension measuring device as set forth in claim 8, wherein
a tolerance is set in advance for each dimension measurement; and
the display control section is configured to display a dimension measurement for which a deviation from the tolerance is greatest among the dimension measurements within the measurement range and outside of the tolerance when there are at least two dimension measurements within the measurement range and the number of dimension measurements within the measurement range and outside of the tolerance is greater than the number of dimension measurements the display section can display.

17. The dimension measuring device as set forth in claim 8, wherein
an order of priority of display is set in advance to the plural dimension measurements;
a tolerance is set in advance for each dimension measurement; and
the display control section is configured to display a dimension measurement from the dimension measurements within the tolerance according to an order of priority of display when there are at least two dimension measurements within the measurement range and there are no dimension measurements within the measurement range and outside of the tolerance.

18. The dimension measuring device as set forth in claim 8, wherein a tolerance is set in advance for each dimension measurement; and the display control section is configured to display at least a part of the dimension measurements within the tolerance at predetermined time intervals when there are at least two dimension measurements within the measurement range and there are no dimension measurements within the measurement range and outside of the tolerance.

19. The dimension measuring device as set forth in claim 8, wherein a tolerance is set in advance for each dimension measurement; and the display control section is configured to display a dimension measurement for which a deviation from the tolerance is smallest among the dimension measurements within the tolerance when there are at least two dimension measurements within the measurement range and there are no dimension measurements within the measurement range and outside of the tolerance.

20. A dimension measuring device comprising:

a plurality of dimension measuring sections for generating plural dimension measurements;

a display section including a bar graph for displaying at least one of the dimension measurements generated by the plurality of dimension measuring sections, wherein the number of dimension measurements the display section can display simultaneously is less than the number of dimension measurements generated by the plural dimension measuring sections; and a display control section for automatically selecting the at least one of the dimension measurements to display on the display section in accordance with the dimension measurements generated by the plural dimension measuring sections, independent of a user input, wherein plural conditions are set in advance for a tolerance of each dimension measurement, and a position in a display range of a bar graph within the tolerance range, and wherein the display section is configured to select a condition from the set plural conditions that causes the tolerance range and the display range of the bar graph to have a ratio within a predetermined ratio and to automatically control the display based on the selected condition.

* * * * *